Patented Sept. 20, 1932

1,878,050

UNITED STATES PATENT OFFICE

KARL WILKE, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

VAT DYESTUFFS OF THE BENZANTHRONE-PYRAZOLANTHRONE SERIES

No Drawing. Application filed February 7, 1931, Serial No. 514,309, and in Germany February 26, 1930.

The present invention relates to new vat dyestuffs of the benzanthrone-pyrazolanthrone series.

More particularly my present invention relates to the new compounds of the following general formula

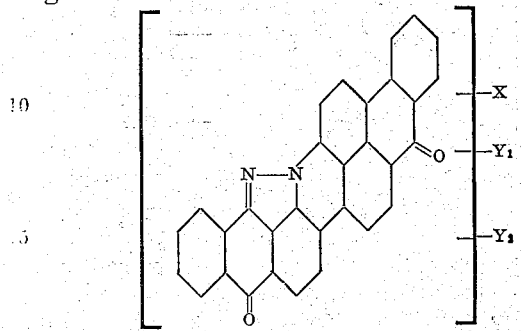

wherein X means that the dyestuff molecule contains one to six halogen atoms, $Y_1$ stands for alkoxy and $Y_2$ for the same alkoxy, or hydrogen.

My new compounds are obtainable, for instance, by subjecting a halogenated benzanthrone-pyrazolanthrone compound to the action of an oxidizing agent and treating the product thus obtainable with an alkylating agent.

According to the proportion of the oxidizing agent used in my process mono-hydroxy, di-hydroxy or keto-derivatives are obtainable. The keto-derivatives may be converted, if desired, into the corresponding hydroxy compounds by means of a weak reducing agent as, for instance, sulfurous acid.

As oxidizing agent one may use, for instance, manganese dioxide, manganic sulfate or nitric acid. As the etherifying agent, I prefer to use para-toluene sulfonic acid alkyl-ester or a dialkyl surface.

The temperatures at which the oxidizing process is preferably carried out are about 20° C. to 100° C.

The etherifying process of the hydroxy compounds may preferably be carried out at temperatures from about 150° C. to 200° C.

The new vat dyestuffs obtainable according to my process are in the dry state dark powders and dissolve in concentrated sulfuric acid to a reddish solution.

The starting material used in my process is obtainable by treating compounds of the benzanthrone-pyrazolanthrone series with halogenating agents according to usual methods.

The halogenating process may be carried out in the absence or in the presence of an organic or inorganic diluent or solvent or a suspending agent, even in the presence of water; furthermore the halogenating action can be promoted by the presence of a catalyst. The halogenated products are also obtainable by synthesis or by replacing exchangeable substituents in the benzanthrone-pyrazolanthrones by halogen. The halogenating process may also be coupled with the oxidizing process.

The following examples serve to illustrate the invention, but they are not intended to limit it thereto, the parts being by weight, unless otherwise stated.

The manner in which the products are obtainable, in principle, is in all cases the same.

20 parts of halogen-benzanthrone-pyrazolanthrone are gradually added to about 300 parts of concentrated sulfuric acid which may contain boric acid, while stirring, or by using a ball mill whereby, sometimes, hydrogen halide more or less perceptible evolves. After the whole is completely dissolved, there are gradually introduced at ordinary temperature, while well stirring and avoiding, as much as possible, an excessive self-heating of the melt, 20 parts of finely powdered pyrolusite or such a quantity thereof as is necessary to effect the generally occuring color change of the melt which is, in most cases, to red or red-brown. When the sulfuric acid solution has lost its property to turn green when exposed in a thin layer to moist air and when a test portion poured into water, yields a yellow, brownish-yellow or olive-yellow precipitate indicating complete oxidation, stirring of the melt is continued for a short time and it is then poured on ice and water. Thereupon, about 200 parts by volume of concentrated bi-sulfite solution are added to the cold suspension of the oxidation product and the whole is stirred at steam bath temperature until the sulfurous acid has disappeared. The yellow quinone, which originally has been obtained, is thereby transformed into the green-blue to green-hydroxyl compound which is filtered, washed and dried.

Instead of pyrolusite, other agents of similar action as, for instance, manganic sulfate, may be used for carrying out the oxidation. By using as the oxidizing agent nitric acid or a mixture of nitric acid and sulfuric acid, also yellow compounds are obtained, having the properties characteristic of oxidation products.

Instead of concentrated sulfuric acid, one may also use sulfuric acid containing a higher percentage of water, as, for instance, a sulfuric acid of 60° Bé.

In order to carry out the alkylation, for instance, one part by weight of each of the oxidation product, calcined sodium carbonate and para-toluene-sulfonic acid methyl-ester are stirred into about 15 parts of nitrobenzene or trichlorobenzene, the temperature of the oil bath being 180° C.–190° C. If required, the same quantity of ester as has already been used, is introduced after about 3 hours, and the temperature is maintained for 6–7 hours in all. As the alkylation progresses, the color of the solution becomes more bluish and clearer. After cooling, the solution is filtered, the solid matter is washed first with a small quantity of nitrobenzene or trichloro-benzene and subsequently with alcohol and water; thereupon it is made into a paste or dried.

The alkylation of the primarily formed oxidation products may also be carried out in an aqueous suspension in the presence of alkali by means of a dialkyl-sulfate at ordinary temperature.

According to the above prescription, the following dyestuffs are obtainable:

(1) By starting from mono-choloro-benzanthrone - pyrazolanthrone — obtainable by causing hydrochloric acid and chlorate to act at 65° C. upon benzanthrone-pyrazolanthrone in a finely subdivided aqueous suspension—a greenish-yellow oxidation product is obtained and from the latter, by mild reduction, a greenish-blue hydroxyl compound which is methylated and forms a dyestuff of the following formula

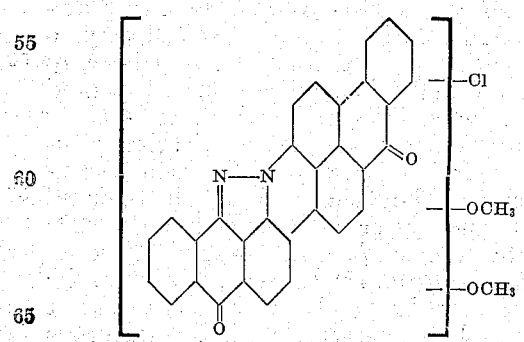

It dyes cotton from a clear blue hydrosulfite vat greenish-blue tints of excellent fastness properties. The dry dye-stuff dissolves in sulfuric acid to a clear wine-red solution.

(2) By starting from dichloro-benzanthrone-pyrazolanthrone—obtainable by causing hydrochloric acid and chlorate to act at 90° C.–100° C. upon benzanthrone-pyrazolanthrone in water—there is obtained, by way of a greenish-yellow quinone-like oxidation product, a greenish-blue hydroxyl compound and by methylating the latter a dyestuff of the following formula

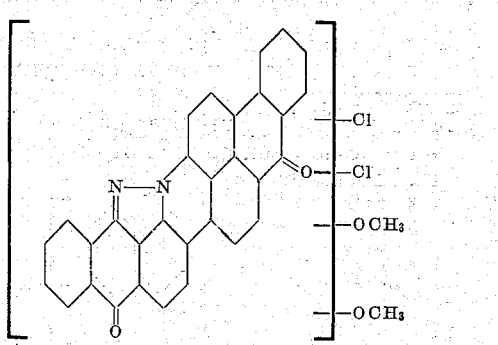

It forms in the dry state a blackish-blue powder, and dissolves in concentrated sulfuric acid to a wine-red solution from which, on dilution with water, bright blue flakes separate. The dyestuff dyes cotton from a blue alkaline hydrosulfite vat greenish-blue tints of excellent fastness properties.

Nearly the same dyestuff yielding blue tints of a slightly more greenish hue is obtainable in the same manner by ethylation of the above hydroxyl compound.

(3) By starting from dichloro-benzanthrone-pyrazolanthrone—obtainable by causing sulfuryl chloride to act at 70° C.–80° C. upon benzanthrone-pyrazolanthrone in nitrobenzene—a dyestuff is obtained which, in its chemical and tinctorial properties, is very similar to the dyestuff obtained according to example 2.

(4) 50 parts of benzanthrone-pyrazolanthrone are suspended in a finely subdivided state in 1200 parts of trichlorobenzene and the mixture is heated near to the boiling point, while stirring. For 3–4 hours, a weak current of dry chlorine gas is passed through the mixture in such a manner that about 65 parts of chlorine are consumed. After cooling, the solution is filtered, the solid matter is washed with benzene and alcohol and dried. A violetish-blue crystalline powder is obtained which dissolves in concentrated sulfuric acid to a bluish-gray solution. The content of chlorine of this product corresponds with that of a trichloro-derivative.

By treating this body according to the above described methods, there is obtained, by way of a greenish-yellow oxidation product and a bluish-green hydroxyl body, a dyestuff of the following formula

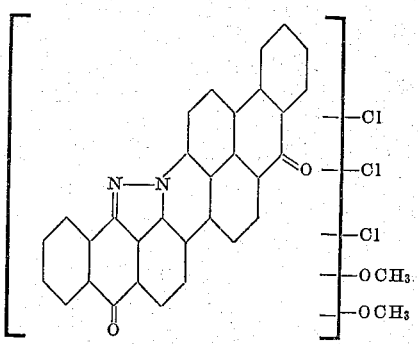

It dissolves in sulfuric acid to a wine-red solution and yields from a blue vat greenish-blue tints.

By passing chlorine for a prolonged time through the mixture used as starting material in this example and, thereby, consuming a larger quantity of chlorine, but otherwise applying the same conditions, more highly chlorinated products are obtained. By using about 100 parts of chlorine, a halogenation product is obtained which, according to the analysis, is nearly a pentachloro-benzanthrone-pyrazolanthrone. It dissolves in concentrated sulfuric acid to a brownish-olive solution, having by transmitted artificial light a clearer green hue. Even this highly chlorinated body may be oxidized to a yellow oxidation product. The dyestuff, obtainable therefrom by reduction and methylation, however, is not uniform and has a small tinctorial power.

(5) By starting from trichloro-benzanthrone-pyrazolanthrone — obtainable by causing chlorine to act at 80° C. to 90° C. for 6–10 hours upon benzanthrone-pyrazolanthrone in nitrobenzene in the presence of pentachloride of antimony as catalyzer—there is obtained by oxidation and methylation a dyestuff which is very similar to that obtained according to Example 4, but yields blue tints of a slightly more reddish hue than those obtained according to Example 4.

(6) 100 parts of benzanthrone-pyrazolanthrone are dissolved in 1000 parts of chlorosulfonic acid, 20 parts of iodine and 10 parts of carbon tetrachloride are added, and the whole is heated under reflux for 10 hours at 60° C., while stirring. The depositing of iodine in the upper part of the vessel and the condenser is prevented by the carbon tetrachloride which is condensed in the condenser and is flowing back to the reaction mass. After cooling, the whole is poured upon a large quantity of ice and the excess of iodine is removed by addition of 50 parts of concentrated bi-sulfite-solution and by heating. The solution is then filtered, the solid matter is washed and dried. A violetish-blue dyestuff powder is obtained which dissolves in concentrated sulfuric acid to an olive solution. According to the analysis, the product is a trichloro-derivative. From a blue vat, it yields on cotton dyeings which, after being soaped at the boil, are blue and have a very reddish hue.

By oxidizing and methylating this product according to the above described methods, a dyestuff of the following formula

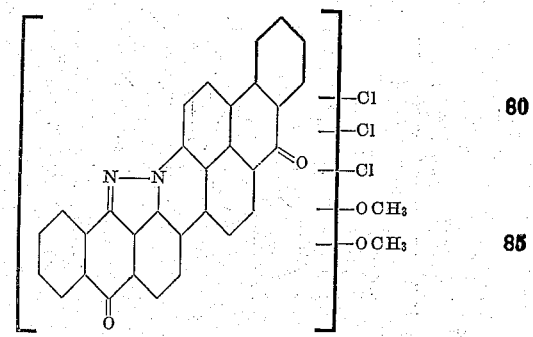

is obtained which dissolves in sulfuric acid to a brownish-wine-red solution and has properties similar to those of the dyestuff obtained according to Example 4.

When the duration of the reaction is shorter and when using smaller quantities of iodine than indicated before, chlorination products containing less chlorine may be obtained which dissolve in sulfuric acid to a brownish-red solution, but have the same tinctorial properties as the above described trichloro-derivative.

By passing, however, a current of dry chlorine gas through a solution of 100 parts of benzanthrone-pyrazolanthrone in 750 parts by volume of chloro-sulfonic acid, in the presence of 5 parts of iodine, for 10 hours, at ordinary temperature, a small rise of the reaction temperature to about 30° C. may be observed. By working up the reaction mixture in the usual manner, there is obtained, with good yield, a product which, according to the analysis, contains 32.1% of chlorine and thus represents a hexachloro-benzanthrone-pyrazolanthrone (calculated content of chlorine: 32.6%). The dry dyestuff forms an intensely blue powder; it dissolves in concentrated sulfuric acid to a brownish-olive solution and is scarcely capable of being vatted. By oxidizing this highly chlorinated body with pyrolusite in sulfuric acid, or by dissolving it in concentrated nitric acid, a yellow oxidation product is obtained which is reduced by means of sulfurous acid into a bluish-green hydroxyl compound which probably contains two hydroxyl groups. By methylating the latter, a greenish-blue vat-dyestuff is obtained which dissolves in concentrated sulfuric acid to a Bordeaux-red solution.

(7) By starting from benzanthrone-8-chloro-pyrazolanthrone—obtainable by condensing 8-chloro-pyrazolanthrone with Bz-1-bromo-benzanthrone and subsequently melting the product with caustic potash—there is obtained, by way of a greenish-yellow oxidation product, an olive-green hydroxyl compound and by methylation of the latter, a dyestuff of the following formula

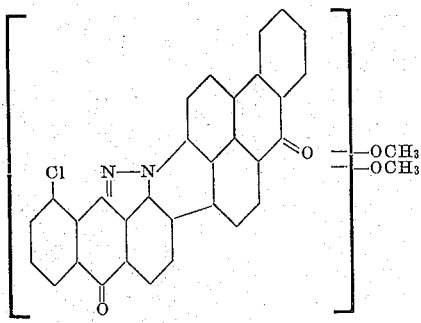

It dyes cotton bluish-green tints.

(8) By starting from dibromo-benzanthrone-pyrazolanthrone—obtainable by causing bromine to act at 90° C.–100° C. upon the aqueous paste of benzanthrone-pyrazolanthrone in the presence of a small quantity of iron—there is obtained by way of a greenish-yellow oxidation product, a green hydroxyl compound and by methylation of the latter, a dyestuff of the following formula

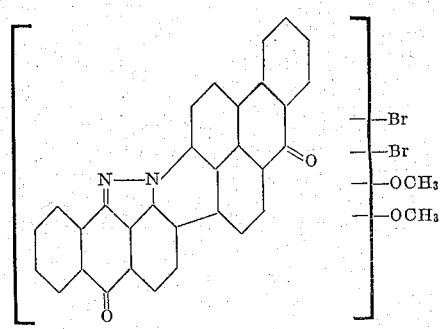

It dissolves in sulfuric acid to a wine-red solution and dyes cotton from a blue vat very greenish-blue tints.

(9) By starting from dibromo-benzanthrone-pyrazolanthrone—obtainable either by causing bromine to act at 40° C. upon benzanthrone-pyrazolanthrone in a chloro-sulfonic acid solution in the presence of iodine, or by brominating benzanthrone-pyrazolanthrone in boiling glacial acetic acid—there is obtained in both cases by way of a yellow oxidation product a greenish-blue hydroxyl compound and from the latter a methoxy-dyestuff which is similar to the dyestuff obtained according to Example 8.

(10) By starting from dibromo-mono-chloro-benzanthrone-pyrazolanthrone—obtainable by causing 3 atomic proportions of bromine to act at 60° C. upon dichloro-benzanthrone-pyrazolanthrone, preferable by means of sulfuryl-chloride, in chloro-sulfonic acid (content of the crude product: 29.5% of bromine, 5.9% of chlorine)—there is obtained by oxidizing and methylating, a dyestuff of the following formula

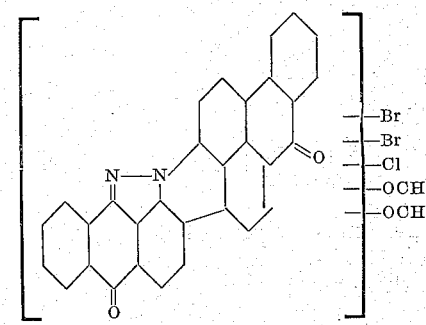

dissolving in concentrated sulfuric acid to a wine-red solution and yielding from a clear blue vat very greenish blue tints.

By suitably dosing the oxidizing agent, it is possible to introduce less than 2 hydroxyl groups into the dyestuff-molecule. By this method of working, there are obtained from the various halogen-benzanthrone-pyrazolanthrones valuable blue vat-dyestuffs of a considerably more reddish hue which have likewise excellent fastness properties.

(11) 20 parts of dichloro-benzanthrone-pyrazolanthrone—obtainable as indicated in Example 2—and 5 parts of crystallized boric acid are dissolved in 300 parts of concentrated sulfuric acid and 4 parts of finely powdered pyrolusite, containing 88.74% of manganese dioxide, corresponding with about 1 molecular proportion of the manganese dioxide, are introduced. After having intimately mixed the whole for one hour, it is poured on ice and water and, after addition of a small quantity of bisulfite, it is boiled and filtered; the solid matter is washed and dried. The product thus obtained—probably the mono-hydroxy-derivative—is a dark violet powder which dissolves in concentrated sulfuric acid to a turbid bluish wine-red solution. By pouring water into this solution, blue flakes separate, which turn green when suspended in alkali. In order to carry out the alkylation, equal parts of the oxidation product, calcined sodium carbonate and p-toluene sulfonic acid-methyl-ester are stirred in about 25 parts of nitrobenzene or trichlorobenzene for 4–5 hours in an oil bath, the temperature of which is 180° C.–190° C. After cooling, the solution is filtered, the solid matter is washed with alcohol and water and it is made into a paste or dried. A dyestuff of the following probable formula

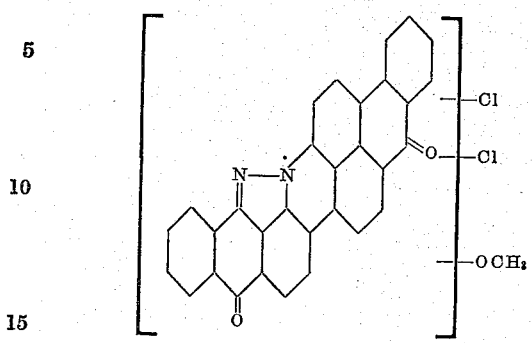

is obtained, yielding from a blue alkaline hydrosulfite vat clear blue tints which, in comparison with the dyeings obtainable from the dialkoxy derivatives according to the present invention, have a reddish hue. The dry dyestuff dissolves in concentrated sulfuric acid to a violetish-red solution.

(12) By equally treating any other halogen derivatives of the benzanthrone-pyrazolanthrones, similar dyestuffs are obtained. By starting, for instance, in Example 11 from trichloro - benzanthrone - pyrazolanthrone—obtainable by causing chlorosulfonic acid to act at 60° C. upon benzanthrone-pyrazolanthrone for 10 hours in the presence of iodine (cf. Example 6)—there is obtained a dyestuff of the following probable formula

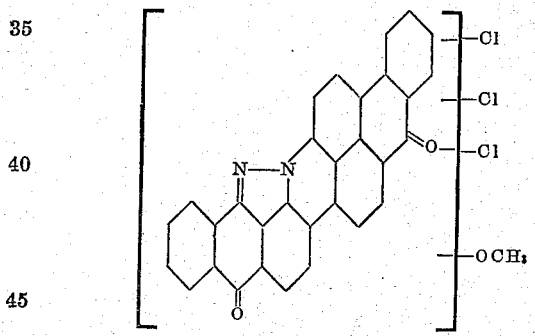

yielding blue tints of considerable reddish hue and dissolving in concentrated sulfuric acid to a brownish wine-red solution.

I claim:

1. As new products, the compounds of the following general formula

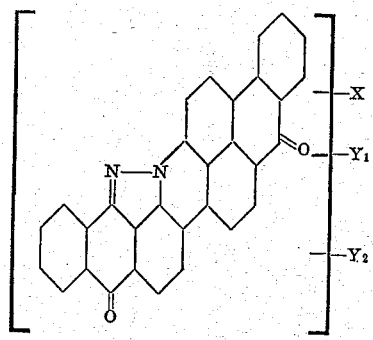

wherein X means that the dyestuff molecule contains one to six halogen atoms, $Y_1$ stands for alkoxy and $Y_2$ for the same alkoxy or hydrogen, forming in the dry state dark powders, dissolving in concentrated sulfuric acid to a reddish solution.

2. As new products, the compounds of the following general formula

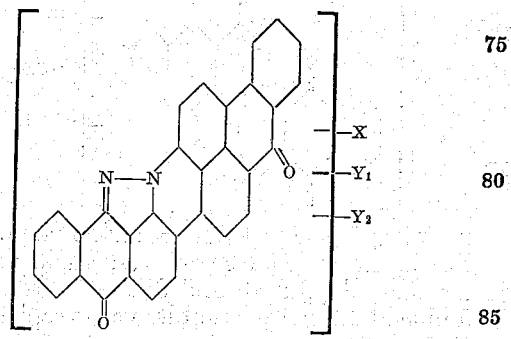

wherein X means that the dyestuff molecule contains one to six chlorine atoms, $Y_1$ stands for methoxy and $Y_2$ for methoxy or hydrogen, forming in the dry state dark powders, dissolving in concentrated sulfuric acid to a reddish solution.

3. As new product; the compound of the following probable formula

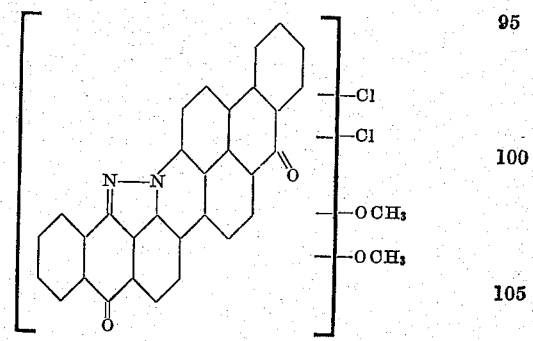

forming a greenish-blue paste or, in the dry state, a dark blue powder, dissolving in concentrated sulfuric acid to a wine-red solution and dyeing cotton from a blue alkaline hydrosulfite vat greenish-blue tints.

4. As a new product, the compound of the following probable formula

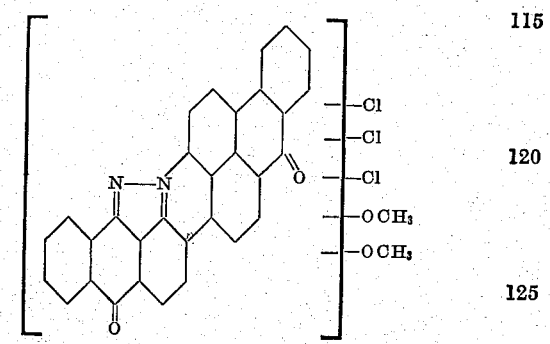

forming in the dry state a dark violetish blue powder, dssolving in concentrated sulfuric acid to a wine-red solution and dyeing cotton from a blue alkaline hydrosulfite vat greenish-blue tints.

5. As a new product, the compound of the following probable formula

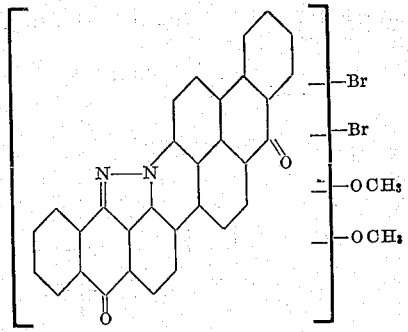

forming in the dry state a dark blue powder, dissolving in concentrated sulfuric acid to a wine-red solution and dyeing cotton from a blue alkaline hydrosulfite vat greenish-blue tints.

In testimony whereof, I affix my signature.
KARL WILKE.